United States Patent
Davis et al.

[11] Patent Number: 5,683,101
[45] Date of Patent: *Nov. 4, 1997

[54] AUTOMOTIVE SEAT PLASTIC AIR BAG COVER

[75] Inventors: David J. Davis, Troy; Thomas L. Eckhout, Waterford, both of Mich.

[73] Assignee: Larry J. Winget, Leonard, Mich.

[*] Notice: The term of this patent shall not extend beyond the expiration date of Pat. No. 5,558,364.

[21] Appl. No.: 618,097

[22] Filed: Mar. 19, 1996

Related U.S. Application Data

[63] Continuation-in-part of Ser. No. 479,850, Jun. 7, 1995, Pat. No. 5,501,483, and Ser. No. 477,873, Jun. 7, 1995, Pat. No. 5,558,364.

[51] Int. Cl.⁶ .................................................. B60R 21/16
[52] U.S. Cl. ........................... 280/728.3; 280/730.2
[58] Field of Search ............................. 280/728.3, 730.2, 280/731, 730.1; 403/329

[56] References Cited

U.S. PATENT DOCUMENTS

| | | |
|---|---|---|
| 5,022,676 | 6/1991 | Rogerson et al. . |
| 5,064,218 | 11/1991 | Hartmeyer . |
| 5,222,761 | 6/1993 | Kaji et al. ............................... 280/732 |
| 5,224,732 | 7/1993 | Warner et al. . |
| 5,251,931 | 10/1993 | Semchena et al. .................. 280/730.1 |
| 5,280,946 | 1/1994 | Adams et al. ...................... 280/728.2 |
| 5,338,060 | 8/1994 | Soderquist .......................... 280/728.3 |
| 5,342,086 | 8/1994 | Harris et al. ........................ 280/728.3 |
| 5,431,435 | 7/1995 | Wilson . |
| 5,501,485 | 3/1996 | Eckhout ............................. 280/728.3 |
| 5,558,364 | 9/1996 | Davis ................................. 280/730.2 |

*Primary Examiner*—Kevin Hurley
*Assistant Examiner*—Jonathan E. Butts
*Attorney, Agent, or Firm*—Brooks & Kushman P.C.

[57] ABSTRACT

A plastic molded, air bag cover mountable in a snap-on fashion onto a retaining member or rim fixedly secured within an automotive seat is provided. The snap-on air bag cover includes a front cover panel including an outer peripheral portion adapted to overlie an air bag container and a close-out ring sewn to an outer fabric of the seat. Resilient clip members extend from the outer peripheral portion toward the retaining member. Each clip member has an extending snap-on groove defined therein adapted to cooperate with the retaining member for affixing the air bag cover to the automotive seat. The clip members are connected to the outer peripheral portion such that the resilient clip members are permitted to pivotably travel away from each other in opposite directions allowing the retaining member to enter and abuttingly engage the snap-on groove thereby retaining the air bag cover on the automotive seat. The retaining member may be a retaining portion of the air bag container or a retaining portion of the close-out ring which prevents tampering of the air bag container within the seat.

23 Claims, 3 Drawing Sheets

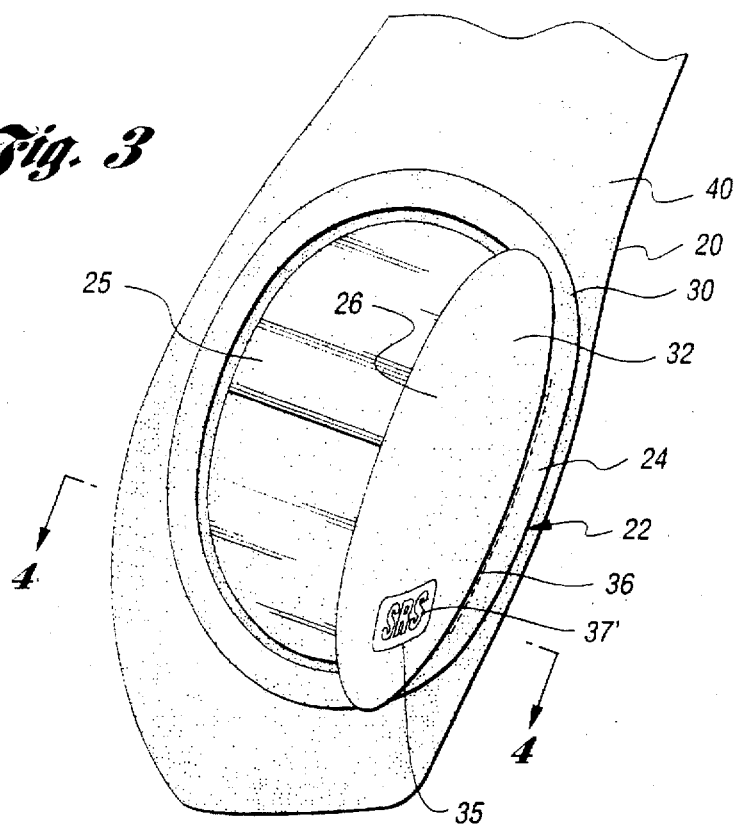
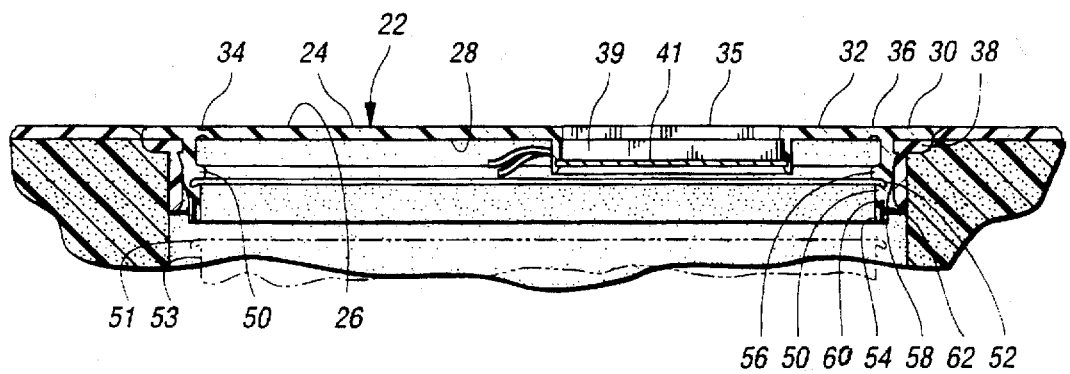
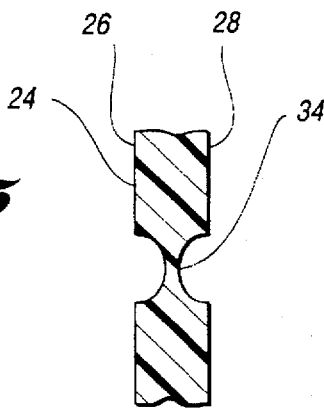
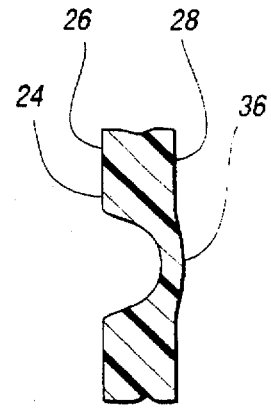

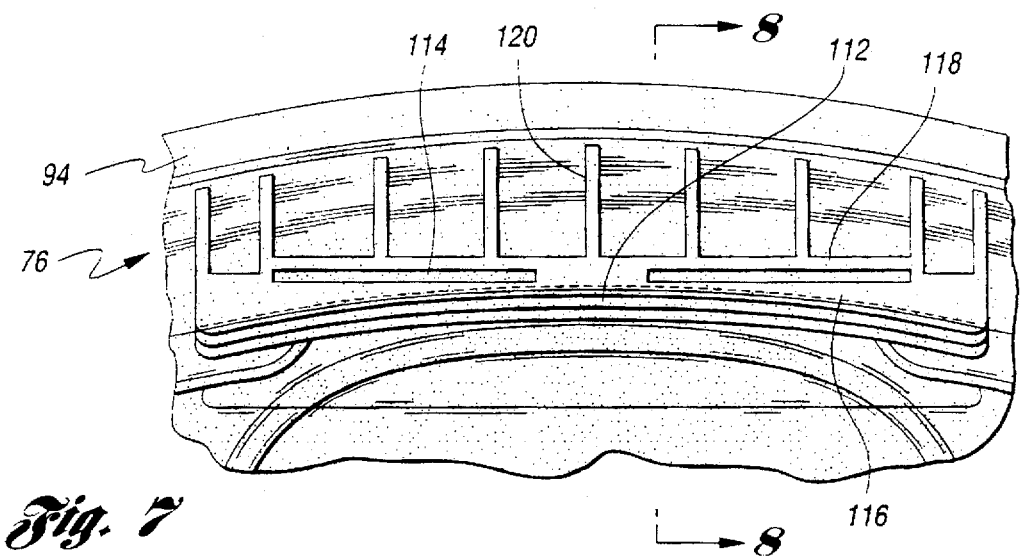
Fig. 7
Fig. 8
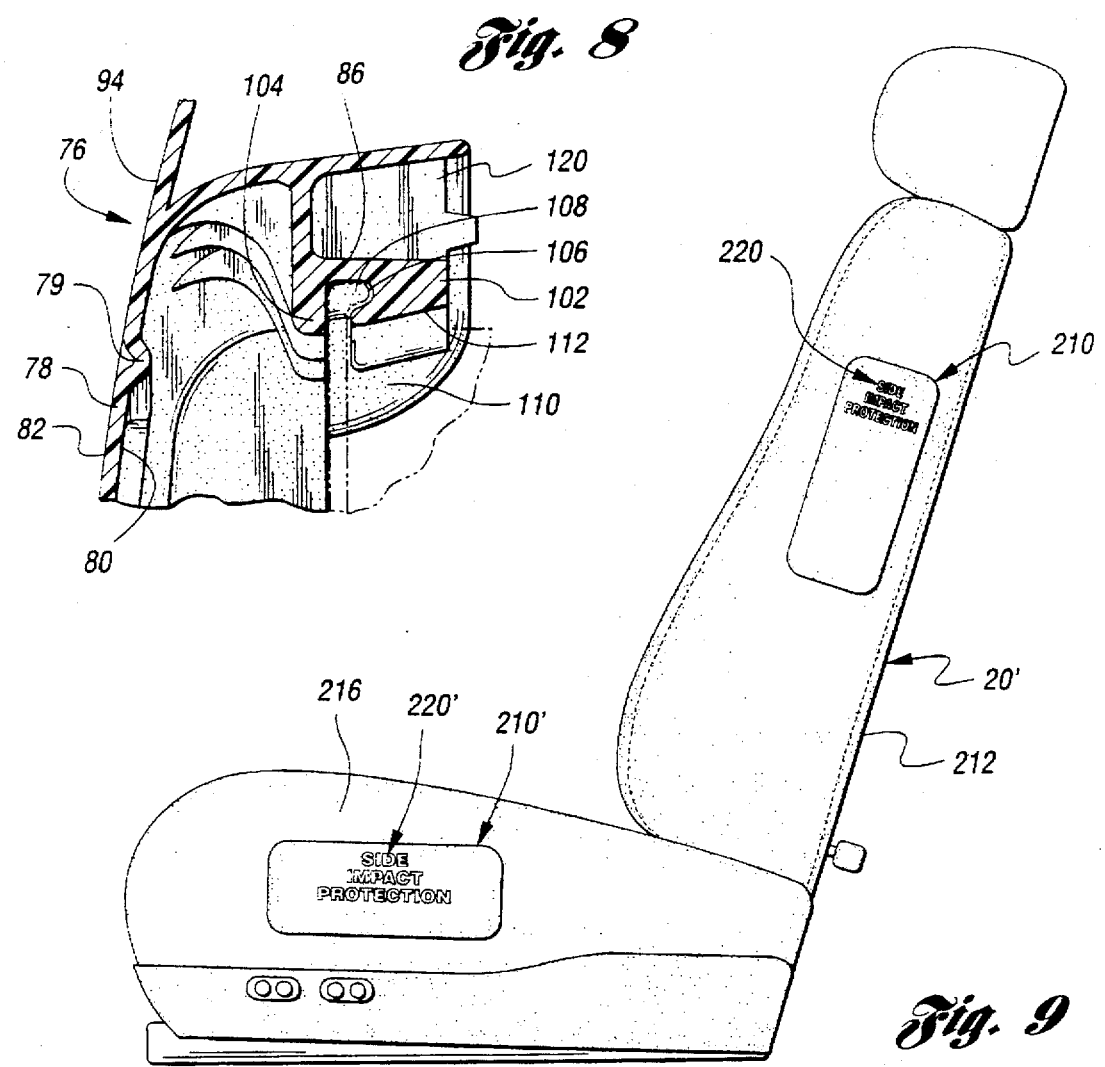
Fig. 9

AUTOMOTIVE SEAT PLASTIC AIR BAG COVER

CROSS-REFERENCE TO RELATED APPLICATION

This application is a continuation-in-part application of U.S. patent application U.S. Ser. No. 08/479,850 entitled "Snap-On Air Bag Cover," filed Jun. 7, 1995 which issued Mar. 26, 1996 as U.S. Pat. No. 5,501,485, and U.S. patent application entitled "Plastic Air Bag Cover Having an Integrated Light Source" filed Jun. 7, 1995 and having U.S. Ser. No. 08/477,873 and which issued Sep. 24, 1996 as U.S. Pat. No. 5,558,364.

TECHNICAL FIELD

This invention relates to plastic air bag covers and, in particular, to plastic air bag covers for automotive seats.

BACKGROUND ART

Presently, when one or more air bags are provided in an automobile, the air bag may be stored in a door panel or in an instrument panel (i.e., IP) of the vehicle. For example U.S. Pat. No. 5,224,732 discloses a side-impact air bag system including a frangible area for allowing egress of the air bag.

U.S. Pat. No. 5,431,435 discloses a side air bag including a weakened portion which tears in order to allow egress of the air bag.

U.S. Pat. No. 5,022,676 discloses an air bag assembly, per se, which includes a rubber gasket.

U.S. Pat. No. 5,064,218 discloses an air bag assembly including fabric rings and a retainer ring that are sewn to the air bag body portion.

During automatic inflation of the air bag, at least a portion of the air bag cover moves away from the air bag container to permit the air bag to perform its safety function between its container and the occupant of the vehicle.

A practice in the automotive industry is utilization of all plastic fabricated air bag covers. Conventional air bag covers used in conjunction with occupant restraint systems often include various connections systems for attaching the air bag cover to the air bag container.

It is also desirable to have an air bag cover which conveys information to an occupant of the vehicle that behind the air bag cover there is a supplemental restraint system (SRS), such as an air bag, which will protect the occupant. This provides reassurance in the form of a reminder that the occupant has extra protection.

Current air bag covers have the phrase "SRS Air Bag" embossed into the front panel of the air bag cover.

SUMMARY OF THE INVENTION

An object of the present invention is to provide a one-piece, plastic molded, snap-on air bag cover that is affixable directly to a retaining member which, in turn, is fixedly secured within an automotive seat.

Another object of the present invention is to provide a plastic, snap-on air bag cover for an automotive seat, and which includes a front cover panel with weakened portions to permit rupture and movement of a door portion of the front cover panel upon inflation of the air bag. An outer peripheral portion of the front cover panel is adapted to overlie a close-out ring which is sewn onto the fabric of the seat.

In carrying out the above objects and other objects of the present invention, a plastic molded, snap-on air bag cover mountable onto a retaining member fixedly secured within an automotive seat is provided. The snap-on air bag cover includes a front cover panel including an outer peripheral portion adapted to overlie an air bag container and first and second resilient clip members extending from opposite sides of the outer peripheral portion. Each clip member has an extending snap-on groove defined therein adapted to cooperate with the retaining member for affixing said air bag cover to the automotive seat. Each clip member is characterized in cross-section as having an engagement section for contacting the retaining member during mounting onto the retaining member and a biasing groove formed therein to facilitate resilient displacement of the engagement section. At least one of the clip members is attached to the outer peripheral portion in a live hinge-like fashion to assist in a snap-on mounting of the cover onto the retaining member.

Further in carrying out the above objects and other objects of the present invention, an air bag cover of the type adapted to snap onto a retaining rim fixedly secured within an automotive seat is provided. The cover includes a homogeneous thermoplastic molded body including a front cover panel having an outer peripheral portion and an inner door portion separable from the outer peripheral portion. The cover further includes a plurality of connectors that project from the outer peripheral portion. Each of the connectors is flexural relative to the outer peripheral portion for snap-on engagement with the retaining rim. Each connector includes a snap-on groove having a cross-sectional shape adapted to receive and retain the retaining rim, and an engagement member positioned ahead of the snap-on groove for guiding the retaining rim into engagement with the snap-on groove during flexural displacement of the connector.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a side elevational view, partially broken away, illustrating another embodiment of an air bag cover constructed in accordance with the present invention and similar to the air bag cover of FIG. 1 with a door portion thereof in an open position;

FIG. 4 is a partially broken away sectional view taken along lines 4—4 in FIG. 3 illustrating a light source module and one embodiment of a snap-on attachment mechanism of the air bag cover;

FIG. 5 is an enlarged, partially broken away sectional view of a tear seam of the air bag cover;

FIG. 6 is an enlarged, partially broken away sectional view of a door hinge of the air bag cover;

FIG. 7 is an enlarged, fragmentary view of the clip connector of the present invention;

FIG. 8 is a cross-sectional view of the clip connector taken along lines 8—8 of FIG. 7; and FIG. 9 is a side elevational view illustrating two alternative locations of a third embodiment of an air bag cover constructed in accordance with the present invention.

BEST MODE FOR CARRYING OUT THE INVENTION

Figure 1:
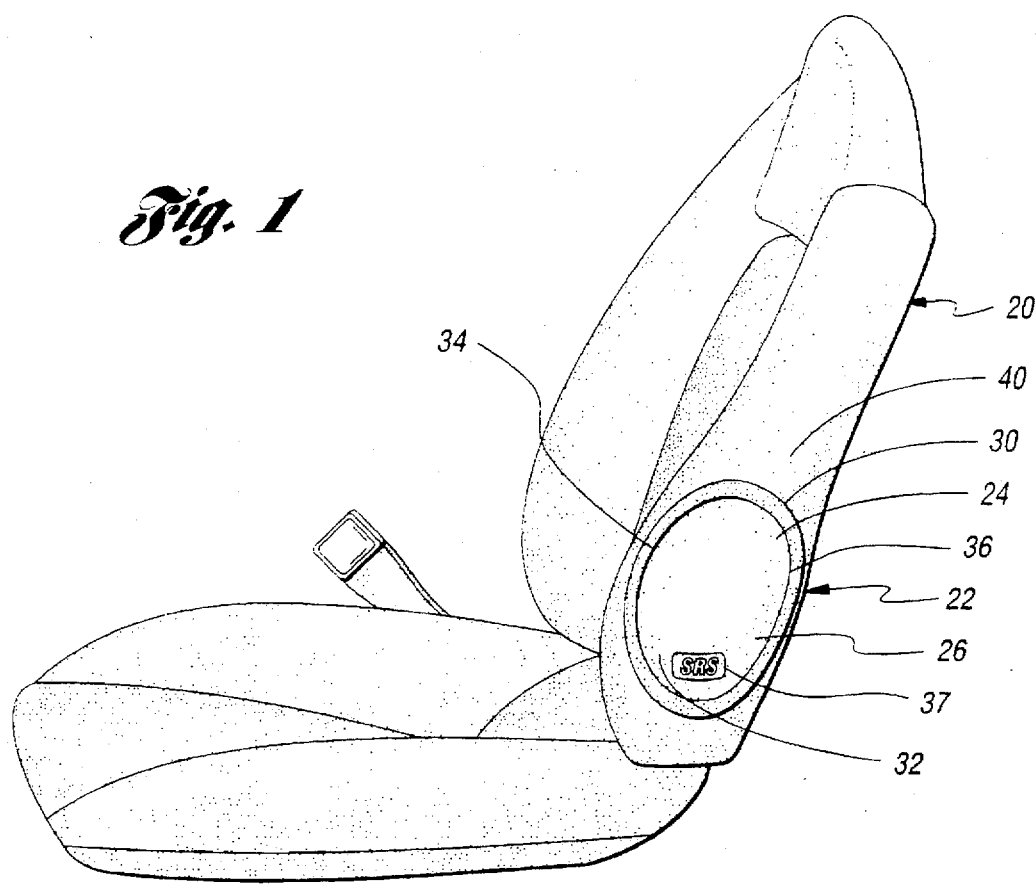
FIG. 1 is an environmental perspective view illustrating an air bag cover constructed in accordance with the present invention.

Referring now to the drawing Figures, there is illustrated in FIGS. 1–9 different embodiments of a plastic molded, snap-on air bag cover including a door portion constructed in accordance with the present invention. In the embodiments of FIGS. 1–9, each air bag cover is adapted to be mounted on a car seat 20 or 20' of a motor vehicle as illustrated in the drawing Figures.

Each of the air bag covers of the present invention is preferably a relatively flexible thermoplastic air bag cover formed by injection molding with a thermoplastic such as Santoprene® (a trademark of Monsanto Co.) Santoprene® 201-87 is a colorable thermoplastic general purpose elastomer with good fluid resistance which is processable by injection molding and extrusion.

The tear strength, ultimate tensile strength, hardness, and elasticity of the material are characteristics important to the choice of the thermoplastic material used to manufacture the air bag cover. The preferred thermoplastic material used for manufacture of the air bag cover has a tensile strength in a range from 15.0 to 17.0 Mpa's. The preferred material used has a tear strength in a range from 47 to 51 kN/M at 25° C. and 21 to 25 kN/M at 100° C. The preferred material used has a durometer hardness in a range of 70 to 100 on the Shore A scale. The above characteristics, in conjunction with the structure of the air bag cover, satisfy the necessary conditions related to the inflation and exit of an air bag from the air bag cover.

Referring now to FIGS. 1 through 6, different embodiments of an air bag cover, generally indicated at 22 are shown. The air bag cover 22 includes a front cover panel 24 overlying an undeployed air bag 25 (i.e. FIG. 3). The front cover panel 24 has a front outer surface 26 and a rear inner surface 28 (i.e. FIG. 4).

Figure 2:
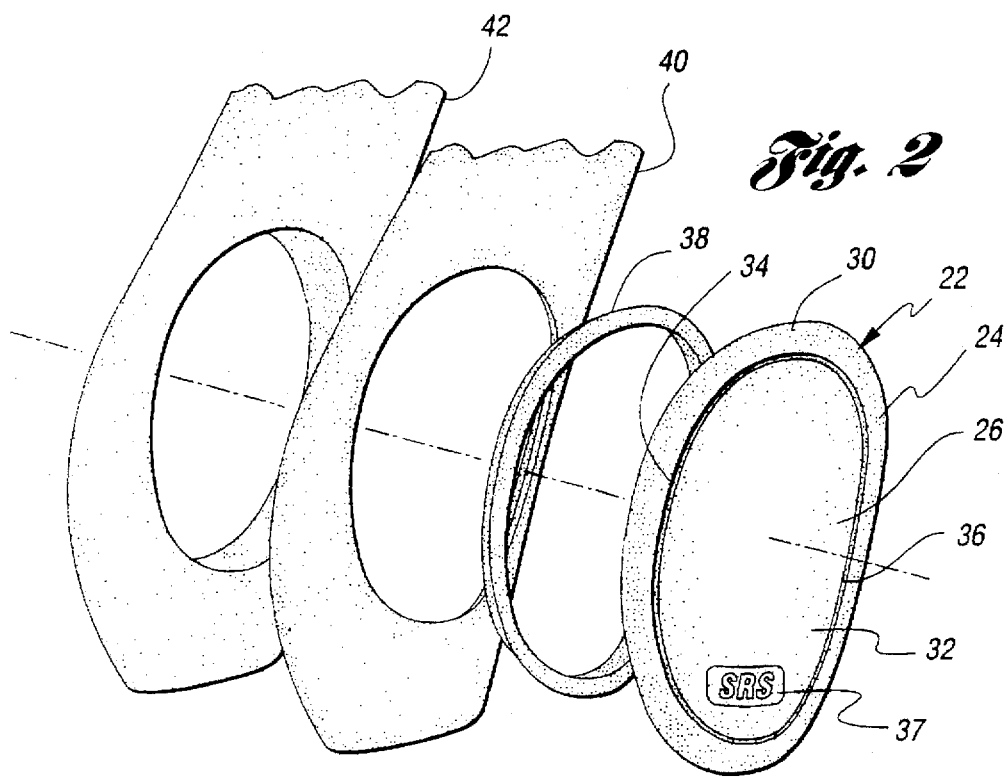
FIG. 2 is a partially broken away exploded view of one embodiment of the air bag cover.

The cover 22 also includes an outer peripheral portion 30 and an inner door portion 32 which is separable from the outer peripheral portion 30 along a tear seam 34 (i.e. FIGS. 2 and 5). The door portion 32 is attached to the outer peripheral portion 30 in a live hinge-like fashion by a door hinge 36 (i.e. FIGS. 3 and 6). The door hinge 36 permits an inflating air bag 25 to exit the cover 22 without the door portion 32 entirely separating from the outer peripheral portion 30.

Referring to FIGS. 1 and 2, the door portion 32 has indicia or graphics 37 such as the letters "SRS" (i.e. supplemental restraint system) molded therein to indicate that an air bag is located below the air bag cover 22.

Referring to FIGS. 3 and 4, there is illustrated a front plate 35 having transparent or translucent indicia 37' formed thereon capable of transmitting light therethrough. The cover 22 of FIGS. 3 and 4 includes a light source module 39 secured at the inner surface 28 of the door portion 32 by a back plate 41 so that light from the light source module 39 is transmitted through the indicia 37' to provide an information-bearing image. Details of such an air bag cover with a light source module can be found in the above-noted application entitled "Plastic Air Bag Cover Having an Integrated Light Source."

The outer peripheral portion 30 of the front cover panel 24 is mountable over a plastic close-out ring 38 which is fixably secured to a fabric layer 40 of the automotive seat 20 such as by sewing. The fabric layer 40 extends over and covers a foam layer 42 of the automotive seat 20 in a conventional fashion (i.e. FIG. 2). The close-out ring 38 prevents tampering with the air bag container.

Referring now to FIG. 4, there are shown a pair of oppositely disposed resilient clip connectors 50 extending rearwardly from the outer peripheral portion 30 of the front cover panel 34. Preferably, two spaced pairs of such clip connectors 50 are provided. A snap-on groove 52 is shown disposed within each clip connector 50. Each clip connector 50 is comprised of a front engagement section 54 and a rear shoulder section 56 with the snap-on groove 52 disposed between the front engagement section 54 and the rear shoulder section 56. The snap-on groove 52 is configured to cooperate with the retaining rim 51 on an air bag container 53 (shown in phantom). For proper connection and retainment, the snap-on groove 52 should have a cross-sectional shape that corresponds to the shape of the air bag container rim 51. Alternatively, the snap-on groove 52 (as well as the rest of the clip connector 50) may be configured to cooperate with a retaining portion of a modified close-out ring to secure the close-out ring and the air bag cover together within the seat 20.

As shown, each clip connector 50 also includes a biasing groove 58 which extends in a direction parallel with the snap-on groove 52. The biasing groove 58 divides the front engagement section 54 into a first segment 60 and a second segment 62. The biasing groove 58 allows the first segment 60 to deform and move toward the second segment when the air bag container rim 51 is initially engaged with the clip connector 50 just prior to full engagement within the snap-on groove 52.

While only two clip connectors 50 are shown in FIG. 4, there are preferably four spaced clip connectors extending rearwardly from the outer peripheral portion 24. It is contemplated in the preferred embodiment that each snap-on groove 52 extends the entire length of its respective clip connector 50.

Referring now to FIGS. 7 and 8, there is shown an alternative embodiment of an air bag cover, generally indicated at 76, and constructed in accordance with the present invention. The air bag cover 76 includes a front cover panel 78 having a hinge 79 and an inner surface 80 and an outer surface 82. The inner and outer surfaces 80 and 82, respectively, define a thickness of front cover panel 78. The air bag cover 76 is designed to be operably located on the automobile seat (not shown) such that the front cover outer surface 82 is exposed to occupant view.

The air bag cover 76 also preferably includes four clip connectors, only one of which is shown in FIGS. 7 and 8 at 86, connected to its respective portion of an outer peripheral portion 94 of the cover 76.

Referring specifically now to FIG. 8, and using the clip connector 86 as representative of the other clip connectors, the clip connector 86 includes a front engagement section 102 and a rear shoulder section 104. As with the prior embodiment, a snap-on groove 106 is defined between the front engagement section 102 and the rear shoulder section 104. The snap-on groove 106 of the second embodiment of the present invention has a cross-sectional shape which corresponds to the rim 108 of an air bag container 110. The snap-on groove 106 of FIG. 8 is L-shaped to correspond to the outer shape of rim 108. The clip connector 86 further includes an outer inclined surface 112.

Referring specifically now to FIG. 7, there is shown a biasing groove 114. The biasing groove 114, as with the prior embodiment discussed above, extends parallel to the snap-on groove 106. The biasing groove 114 divides the clip connector 86 into a first segment 116 and a second segment 118. As those skilled in the art will recognize, the inclined surface 112 in cooperation with the biasing groove 114 assist in locating and abuttingly engaging the rim 108 of the air bag container 110 within the snap-on groove 106. As with the first embodiment, alternatively, the snap-on groove 106, as well as the rest of the clip connector 86, may be configured to cooperate with a retaining portion of a modified close-out ring to secure the close-out ring and the air bag cover together within the automotive seat 20.

As the rim 108 of the air bag container 110 initially contacts the clip connector 86, the rim 108 slides along the inclined surface 112 toward the snap-on groove 106. Simultaneously, the first segment 116 of the front engagement section 102 is deformed and moves toward the second segment 118. In this fashion, the snap-on connection of the air bag cover 76 to the air bag container 110 is assisted. For structural integrity and material cost savings, it is contemplated that the front engagement section 102 may include a plurality of spaced apart, parallel supports 120 which are disposed perpendicular to the snap-on groove 106.

Each clip connector, such as the clip connector 86, extends from a respective portion of the outer peripheral portion 94. Each clip connector also is attached to the respective portion of the outer peripheral portion 94 in a live hinge-like fashion such that each clip connector moves away from the other clip connectors upon operative insertion of the air bag container rim 108 within the snap-on groove 106.

For example, opposing clip connectors move away from each other as the rim 108 is abuttingly engaged against the inclined surfaces 112 of each opposing clip connector. Further, the cooperation of the biasing grooves 114 in the other pair of opposing clip connectors works to assist in locating and operatively connecting the air bag container 110 to the air bag cover 76.

The particular thermoplastic described above assists in providing the operative resilient characteristics needed to provide an air bag cover which is directly affixable to an air bag container. The air bag cover of the present invention is resilient enough to accept deformation of the clip connectors when the air bag cover is being connected to the air bag container and rigid enough to contain the air bag cover on the air bag container or the close-out ring (not shown) throughout the operative life of the associated vehicle. Thus, the tear strength, ultimate tensile strength, hardness, and elasticity of the thermoplastic material, as described above are important to the overall operation of the air bag cover.

The air bag cover of the present invention is preferably injection molded using conventional injection molding techniques.

Referring now to FIG. 9, there are illustrated other embodiments of plastic snap-on air bag covers, generally indicated at 210 and 210', constructed in accordance with the present invention. The cover 210 is secured at a back side 212 of the driver or passenger seat 20'. The cover 210' is secured to a bottom side 216 of the seat 20'. The covers 210 and 210' may or may not include light source modules 220 and 220' which would be similar to the module 39. However, the covers 210 and 210' would at least include indicia to convey graphical information to a user of the automotive seat. Like the module 39, the modules 220 and 220' may include transparent or translucent indicia or graphics such as the phrase "SIDE IMPACT PROTECTION."

While the best mode for carrying out the invention has been described in detail, those familiar with the art to which this invention relates will recognize various alternative designs and embodiments for practicing the invention as defined by the following claims.

What is claimed is:

1. A plastic molded, snap-on air bag cover mountable onto a retaining member fixedly secured within an automotive seat, the air bag cover comprising:

a front cover panel including an outer peripheral portion adapted to overlie an air bag container;

first and second resilient clip members extending from opposite sides of the outer peripheral portion, each clip member having an extending snap-on groove defined therein adapted to cooperate with the retaining member for affixing the air bag cover to the automotive seat, each clip member characterized in cross-section as having an engagement section for contacting the retaining member during mounting onto the retaining member and a biasing groove formed therein to facilitate resilient displacement of the engagement section and wherein at least one of the clip members is attached to the outer peripheral portion in a live hinge-like fashion to assist in a snap-on mounting of the cover onto the retaining member, wherein the outer peripheral portion is mountable over a close-out ring fixedly secured to the automotive seat about the air bag container.

2. A snap-on air bag cover as in claim 1 wherein each clip member comprises a front engagement section and a rear shoulder section, said front engagement section having an inclined outer surface for cooperating with said retaining member for sliding said air bag cover onto said retaining member, the respective snap-on groove being disposed between said front and rear sections.

3. A snap-on air bag cover as in claim 2 wherein each front engagement section includes a plurality of spaced, parallel supports disposed perpendicular to its snap-on groove.

4. A snap-on air bag cover as in claim 2 wherein each biasing groove is disposed parallel to its snap-on groove and dividing the front engagement section into a first segment and a second segment, the biasing groove adapted to permit the first segment to move laterally in relation to the second segment and allow the retaining member to enter and locate within the snap-on groove.

5. A snap-on air bag cover as in claim 2 wherein the snap-on groove is "L" shaped in cross-section.

6. A snap-on air bag cover as in claim 1 wherein the front cover panel includes an inner door portion separable from the outer peripheral portion and attached to the outer peripheral portion in a live hinge-like fashion to permit an inflating air bag to exit the cover without the inner door portion entirely separating from the outer peripheral portion.

7. A snap-on air bag cover as in claim 1 wherein the air bag container includes the retaining member.

8. A snap-on air bag cover as in claim 1 manufactured from a resilient thermoplastic material.

9. A snap-on air bag cover as in claim 8 wherein the thermoplastic material is a thermoplastic rubber.

10. An air bag cover as in claim 8 wherein the material has a tensile strength in a range from 15.0 to 17.0 Mpa and a tear strength in a range from 47 to 51 kN/M at 25° C. and 21 to 25 kN/M at 100° C.

11. An air bag cover as in claim 8 wherein the material has a durometer hardness ranging from 70 to 100 on the Shore A scale.

12. An air bag cover of the type adapted to snap onto a retaining rim fixedly secured within an automotive seat, the cover comprising:

a homogeneous thermoplastic molded body including a front cover panel having an outer peripheral portion and an inner door portion separable from the outer peripheral portion;

a plurality of connectors projecting from the outer peripheral portion, each of the connectors being flexural relative to the outer peripheral portion for snap-on engagement with the retaining rim, each connector comprising:
    a snap-on groove having a cross-sectional shape and adapted to receive and retain the retaining rim; and
    an engagement member positioned ahead of the snap-on groove for guiding the retaining rim into engagement with the snap-on groove during flexural displacement of the connector;
wherein the front cover panel has an outer surface provided with indicia representing graphical information.

13. The air bag cover of claim 12 wherein at least one of the engagement members is co-extensive with its groove.

14. The air bag cover of claim 12 wherein at least one of the engagement members is resiliently displaceable in response to relative movement of the retaining rim toward engagement with its groove.

15. The air bag cover of claim 14 wherein at least one of the engagement members is divided into first and second spaced sections which are resiliently displaceable relative to one another to assist guidance of the retaining rim into engagement with its groove.

16. The air bag cover of claim 12 wherein at least one of the engagement members is formed with an inclined surface for contacting the retaining rim to guide the retaining rim into engagement with its snap-on groove.

17. The air bag cover of claim 16 wherein the inclined surface is provided structural support by a plurality of spaced supports disposed perpendicularly to the groove and internally of the inclined surface.

18. The air bag cover of claim 12 wherein the connector further comprises an array of spaced, parallel supports joining the engagement member to the associated transverse wall for structural support.

19. The air bag cover of claim 18 wherein the supports are disposed perpendicularly to the groove.

20. The air bag cover of claim 12 wherein the connectors are formed on at least one pair of oppositely disposed portions of the outer peripheral portion.

21. The air bag cover of claim 12 wherein the connectors are formed on first and second pairs of oppositely disposed portions of the outer peripheral portion.

22. The air bag cover of claim 12 wherein the front cover panel has an inner surface and the indicia are capable of transmitting light therethrough and wherein the cover further comprises a light source module secured to the inner surface such that light from the light source module is transmitted through the indicia to provide an information-bearing image whereby the graphical information is provided.

23. The air bag cover of claim 12 wherein the air bag container includes the retaining rim.

* * * * *